US011336627B2

(12) United States Patent
Manasse et al.

(10) Patent No.: US 11,336,627 B2
(45) Date of Patent: May 17, 2022

(54) PACKET INSPECTION AND FORENSICS IN AN ENCRYPTED NETWORK

(71) Applicant: salesforce.com, inc., San Francisco, CA (US)

(72) Inventors: Mark Manasse, San Francisco, CA (US); Amit Limaye, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 400 days.

(21) Appl. No.: 16/512,683

(22) Filed: Jul. 16, 2019

(65) Prior Publication Data

US 2020/0053124 A1 Feb. 13, 2020

Related U.S. Application Data

(63) Continuation of application No. 15/421,549, filed on Feb. 1, 2017, now Pat. No. 10,397,274.

(60) Provisional application No. 62/451,131, filed on Jan. 27, 2017.

(51) Int. Cl.
*H04L 29/06* (2006.01)
*G06F 9/455* (2018.01)

(52) U.S. Cl.
CPC ...... *H04L 63/0428* (2013.01); *G06F 9/45558* (2013.01); *H04L 63/0281* (2013.01); *H04L 63/061* (2013.01); *H04L 63/166* (2013.01); *G06F 2009/45583* (2013.01); *G06F 2009/45587* (2013.01)

(58) Field of Classification Search
CPC ............. H04L 63/0428; H04L 63/0281; H04L 63/061; H04L 63/166; G06F 9/45558; G06F 2009/45583; G06F 2009/45587
See application file for complete search history.

(56) References Cited

U.S. PATENT DOCUMENTS

| 5,029,206 A | 7/1991 | Marino, Jr. |
| 7,441,043 B1 | 10/2008 | Henry |
| 8,295,808 B2 | 10/2012 | Gehrmann |

(Continued)

FOREIGN PATENT DOCUMENTS

WO WO-2016118131 A1 * 7/2016 ............. H04L 63/06

OTHER PUBLICATIONS

Robert Westervelt, "The Blind State of Rising SSL/TLS Traffic: Are You Cyber Threats Visible?", External Publication of IDC, Jul. 2016, pp. 1-14.

(Continued)

*Primary Examiner* — Sarah Su
(74) *Attorney, Agent, or Firm* — Butzel Long

(57) ABSTRACT

According to an implementation of the disclosure, a computing device may record substantially all the network traffic being transported over a first node of a network over a period of time. The computing device may receive an authenticated request from a forensics system that includes access criteria. The first computing device may determine a relevant encrypted and unencrypted portion of the network traffic based on the access criteria. Based on unencrypted portion, the computing device may recalculate an encryption key applicable to the encrypted portion. The computing device may then replicate the relevant portion and the encryption key to the forensics system for forensic analysis.

20 Claims, 7 Drawing Sheets

(56) References Cited

U.S. PATENT DOCUMENTS

| | | | |
|---|---|---|---|
| 8,549,282 B2* | 10/2013 | Sabo | H04L 63/0442 |
| | | | 713/152 |
| 8,555,057 B2 | 10/2013 | Raftelis | |
| 9,202,076 B1 | 12/2015 | Chazin | |
| 9,325,945 B2 | 4/2016 | Saremi | |
| 9,444,620 B1 | 9/2016 | Murphy | |
| 9,893,883 B1* | 2/2018 | Chaubey | H04L 63/061 |
| 10,015,286 B1 | 7/2018 | Costlow | |
| 10,079,810 B1* | 9/2018 | Moore | H04L 63/0428 |
| 2004/0093371 A1 | 5/2004 | Burrows | |
| 2006/0080441 A1 | 4/2006 | Chen | |
| 2008/0046714 A1 | 2/2008 | Suganthi | |
| 2013/0182843 A1* | 7/2013 | Buckley | H04L 9/12 |
| | | | 380/255 |
| 2014/0337628 A1 | 11/2014 | Amato | |
| 2015/0222424 A1* | 8/2015 | Mosko | H04L 9/08 |
| | | | 713/171 |
| 2017/0285978 A1 | 10/2017 | Manasse | |
| 2017/0289104 A1 | 10/2017 | Shankar | |
| 2017/0366524 A1 | 12/2017 | Lee | |
| 2018/0150412 A1 | 5/2018 | Manasse | |
| 2018/0288009 A1* | 10/2018 | Yang | H04L 63/06 |
| 2020/0145396 A1* | 5/2020 | Kondapavuluri | H04L 63/061 |
| 2020/0193017 A1* | 6/2020 | Bannister | G06F 21/629 |
| 2020/0236093 A1* | 7/2020 | Bannister | H04L 9/0861 |

OTHER PUBLICATIONS

Oracle, "Oracle Audit Vault and Database Firewall", An Oracle White Paper, Apr. 2014, pp. 1-16.

* cited by examiner

US 11,336,627 B2

PACKET INSPECTION AND FORENSICS IN AN ENCRYPTED NETWORK

BACKGROUND

A relatively large percentage of inbound traffic on the networks of many cloud-based software providers is encrypted. These software providers need to inspect the data on their networks to protect against malware and other unauthorized network access. Except in certain circumstances such as the use of homomorphic encryption or arithmetic changes to the cleartext, encrypted network traffic must be decrypted prior to inspection. As a result, inspecting encrypted network traffic demands additional time and system resources from cloud-based software providers. Conventional techniques for inspecting encrypted network traffic, such as man-in-the-middle monitoring systems, function by decrypting, inspecting, and then re-encrypting all traffic between network nodes. These techniques render network data visible during the inspection process, introduce increased packet loss and higher latency due to increased routing complexity, and are difficult to reconfigure once established. Other conventional techniques decrypt all network traffic at a node of the network, which creates an increased demand on system resources at that node and may reveal network activity that customers, partner services, or internal systems desire to keep private.

BRIEF DESCRIPTION OF THE DRAWINGS

The accompanying drawings, which are included to provide a further understanding of the disclosure, are incorporated in and constitute a part of this specification. The drawings also illustrate implementations and embodiments of the disclosure and together with the detailed description serve to explain the principles of implementations and embodiments of the disclosure. No attempt is made to show structural details in more detail than may be necessary for a fundamental understanding of the disclosure and various ways in which it may be practiced.

DETAILED DESCRIPTION

To address issues relating to inspecting encrypted network traffic, including those issues described above, implementations of this disclosure may provide for replicating some or substantially all network traffic received at a network node and selectively providing access and decryption capabilities in response to requests from a forensics system. For example, an access management system can request access to network traffic from a first node in a network. The first node can grant access, and the access management system can record substantially all network traffic being transmitted over the first node.

The forensics system may send a request to the access management system to gain access to a particular portion of the network traffic. The access management system can authenticate the request and determine the portion of the recorded network traffic that is relevant to the forensics system's request. The access management system can calculate an encryption key based on a private key received from the first node and an unencrypted value exchanged during a relevant network key exchange event. The access management system can then mirror the relevant portion of the recorded network traffic to the forensics system and provide the calculated encryption key to the forensics system. The forensics system may then decrypt the relevant portion of recorded network traffic using the calculated encryption key and employ forensics analysis techniques to detect the presence of data associated with unauthorized network access. In some implementations, the forensic system may establish a secured communication channel with the access management system. The access management system can then decrypt the relevant portion of recorded network traffic and transmit the decrypted relevant portion to the forensics system for analysis without providing the calculated encryption key.

Component Environment

Figure 1:
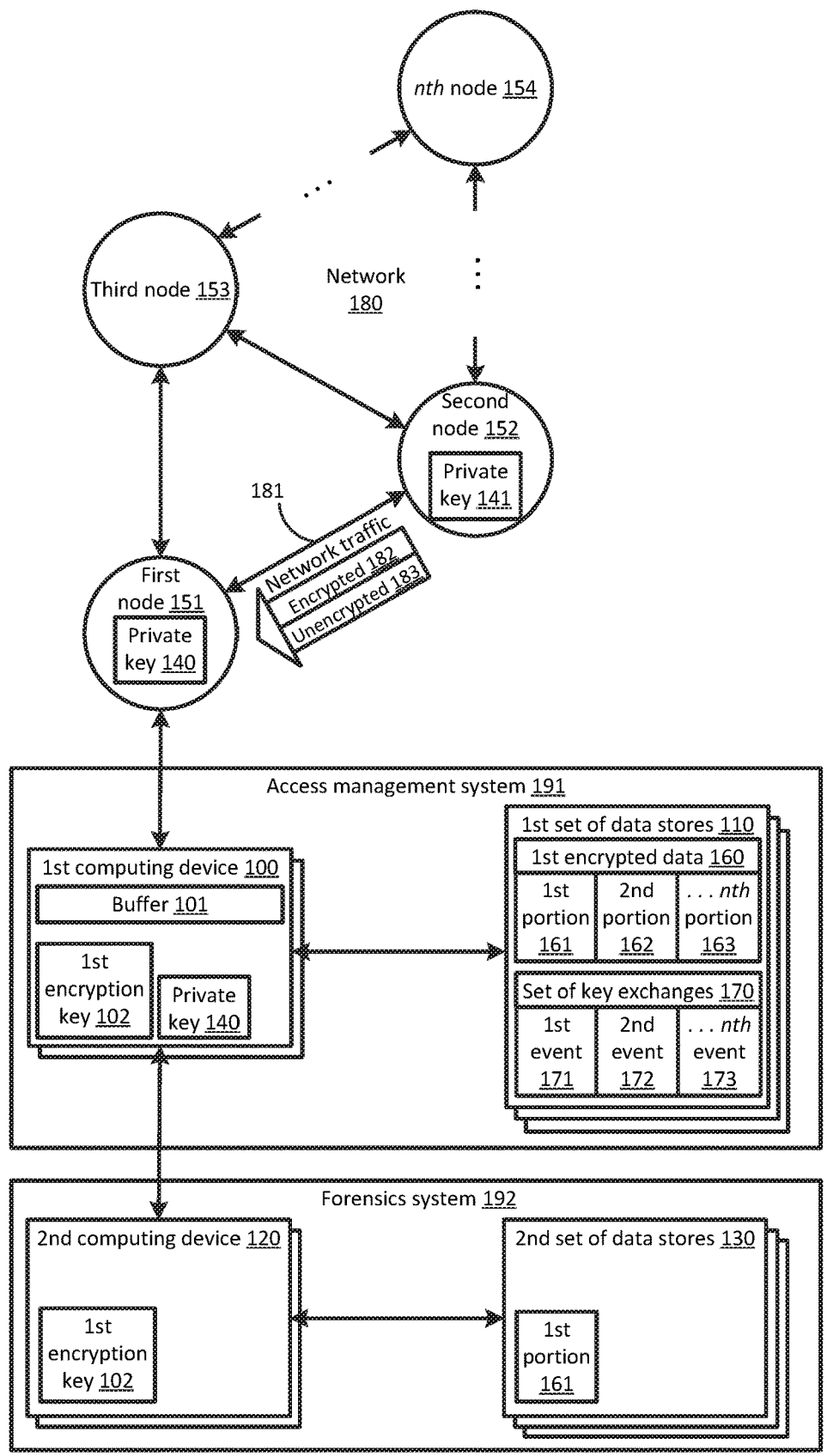
FIG. 1 shows an example system diagram of a component environment according to an implementation of the disclosure.

Implementations of this disclosure may be executed in a variety of component environments. For example, FIG. 1 shows an example system diagram of a component environment according to an implementation the disclosure. An access management system 191 may include one or more first computing devices 100 in communication with a first set of one or more first data stores 110. First computing device 100 may include in-memory buffer 101. In-memory buffer 101 may be a temporary storage area in the memory of first computing device 100 and may be a pre-allocated area of that memory, which is configured for low-latency, high-throughput data transfer. In general, first computing device 100 may include any combination of hardware and/or software suitable for the purposes of this disclosure such as any of those discussed with respect to computing device 900 shown in FIG. 9 below. First data stores 110 can include one or more data stores having any combination of hardware and/or software suitable for the purposes of this disclosure such as any of those discussed with respect to data stores 1060 and 1070 shown in FIG. 10 below. A set of data stores or a set of other aspects of this disclosure may include one element or multiple elements.

A network, such as network 180 may include a set of one or more nodes up to an arbitrary nth number of nodes, such as a nodes 151, 152, 153, and 154 shown in FIG. 1. Each node 151-154 in network 180 can store a private key for encrypting network traffic between two or more of nodes 151-154. For example, first node 151 can store first private key 140, which may be used alone or in conjunction with other data to encrypt and decrypt network traffic 181 between second node 152 and first node 151. The private keys of nodes 151-154 may be distinct in quantity and/or different in quality such that each private key in network 180 may be unique within network 180. Nodes 151-154 may include any combination of hardware and software suitable for the purpose of this disclosure and may include, for example, any of the network components 1010-1070 discussed below with respect to the network arrangement depicted in FIG. 10.

Network traffic 181 may include encrypted network traffic 182 and unencrypted network traffic 183. Generally, encrypted network traffic 182 may be considered traffic carrying ciphertext, and unencrypted network traffic 183 may be considered traffic carrying cleartext. Encrypted network traffic 182 may include one or more data packets or fragments of data packets that are encrypted and transported in accordance with any encryption protocol suitable for the purposes of this disclosure, including, for example, a secure shell protocol, secure sockets layer protocol, transport layer security protocol, and internet protocol security protocol.

Encryption algorithms employed in encrypting encrypted network traffic 182 may include any one or more encryption algorithms suitable for the purposes of this disclosure, including, for example, the Triple Data Encryption Algorithm; Advanced Encryption Standard in cypher block chaining mode or Galois counter mode; Diffie-Hellman, Rivest-Shamir-Adleman, or Digital Signature Algorithm in 2048-bits or 3072-bits and/or elliptic curve variants; and the Secure Hash Algorithm 1 or the Secure Hash Algorithm at 256-bits, 384-bits, or 512-bits, including for calculating keyed-hash message authentication codes, or variants yet to be standardized at greater key lengths and alternative arithmetic rings, lattices, or other suitable mathematical structures as such protocols emerge as industry standards. In some implementations, encryption algorithms may be used in combination. For example, a Diffie-Hellman algorithm may execute to exchange a key exchange that is used to execute a communication encrypted in accordance with an Advanced Encryption Standard algorithm.

Portions of encrypted network traffic 182 may include data packets or packet fragments where some or all of a respective packet or packet fragment is encrypted. For example, in some implementations the payload of a respective data packet included in encrypted network traffic 182 may be encrypted, but not the header. In other implementations the entire data packet in encrypted network traffic 182 may be cryptographically encapsulated, including the header. Encryption techniques may be executed to provide functionality such as authentication, data integrity, and/or, in some implementations, key exchanging.

Unencrypted traffic 183 may include one or more data packets or packet fragments that are not encrypted when transported. Portions of unencrypted network traffic 183 may include, for example, key exchange events between nodes 151-154 of network 180 such as an encryption session initiation event. An encryption session initiation event may be an event where two nodes of network 180 exchange data packets carrying data sufficient for the generation of an encryption key. The generated encryption key can be used to encrypt and decrypt network traffic between the nodes for the time period of the session. For example, in some implementations, first node 151 and second node 152 may each exchange an unencrypted value that functions as a parameter in a key generation process or a value calculated from a generation process in an encryption protocol based on a Diffie-Hellman key exchange algorithm. A session may be defined, for example, by an amount of time during which encrypted data is exchanged or by a quantity of encrypted data exchanged. Key exchange events may also include key refresh events or renegotiation events, where nodes of a network exchange data packets sufficient for the generation of a new key to replace the encryption key used in the previous session. Portions of unencrypted network traffic 183 may also include other exchanges of data such the transport of initialization vectors relevant to an encrypted session as well as other general unencrypted network traffic.

In some implementations, computing device 100 can send a request to first node 151 to access network traffic, such as network traffic 181. First node 151 can be in communication with first computing device 100 over a first secure communication channel. First node 151 may grant this request, such as by authenticating first computing device 100. Once access is granted, first computing device can begin replicating network traffic 181 received at first node 151 to first data stores 110. For example, portions of network traffic 181 can be initially recorded from first node 151 to in-memory buffer 101 of first computing device 100. First computing device 100 can then read in-memory buffer 101 and write the recorded portions of network traffic 181 to the first set of data stores 110.

Network traffic 181 can arrive at a network node, such as first node 151 at a relatively high data rate, such as several gigabytes per second. In some implementations it will be beneficial to record substantially all network traffic received at a network node. Thus an access management system executing in accordance with this disclosure may be structured to record network traffic at a rate substantially the same as it is received at the network node. Accordingly, in some implementations, first computing device 100 can stream network traffic 181 from first node 151 to in-memory buffer 101 and horizontally partition or shard the network traffic 181 stored on in-memory buffer 101. Further, first computing device 100 can write the stored network traffic 181 in parallel to one or more first data stores 110 in accordance with a log-write process. The first data stores 110 may include non-volatile data storage devices such as solid state hard drives and may include striped disks to minimize seeking, as well as battery-backed storage, flash, phase-change, or other semi-permanent low-latency devices. Data stores of first data stores 110 may be geographically distributed, such as in a cloud computing environment, and/or proximately located to each other or first computing device 100.

In some implementations, first computing device 100 can write first data, such as first portion 161 to an in-memory buffer 101 of first computing device 100. First computing device 100 can horizontally partition first portion 161 within in-memory buffer 100 and read two or more portions of first portion 161. First computing device 100 can write the two or more portions substantially in parallel to two or more data stores of the set of data stores 110. For example, two or more threads of a processor of first computing device 100 may execute operations to write the two or more portions of first portion 161 to data stores 110.

In some implementations, techniques such as writing in parallel, sharding, or writing to the in-memory buffer 101 may reduce latency in the writing of first data, such as first portion 161 to the first data stores 110. For example, the writing of first data such as first portion 161 to at least a first data store of data stores 110 may include writing data of the first portion 161 to an in-memory buffer 101 at a rate that is substantially equal to or greater than a rate at which data of the network traffic 180 arrives at first node 151.

Network traffic 181 that is stored on first data stores 110 may include portions of encrypted network traffic 182 such as first encrypted data 160 and portions of unencrypted network traffic 183 such as the set of one or more key exchange events 170. First encrypted data 160 may be associated with indicators of the distinct sessions during which first encrypted data 160 was transmitted over network 180. For example, first portion 161 of first encrypted data 160 may be indexed to correspond to first key exchange event 171 of the set of key exchange events 170, second portion 162 may be indexed to correspond to second key exchange event 172, and so forth, through the indexing of nth portion 163 to correspond to nth key exchange event 173.

Each key exchange event 171-173 may be associated with a different encryption key that was used to encrypt a respective corresponding portion of first encrypted data 160. For example, first key exchange event 171 may include one or more values that may be used with first private key 140 of first node 151 to decrypt the corresponding portion 161 of first encrypted data 160, second key exchange event 172 may include one or more values that may be used with private key 140 or a different private key of node 151 to decrypt the corresponding portion 162, and so forth with respect to other portions of first encrypted data 160, other key exchange events of the set of key exchange events 170, and private keys of node 151.

Each portion of first encrypted data 160 and each key exchange event of the set of key exchange events 170 may be associated with a time range. For example a clock time may be recorded when the first packet or packet fragment of first portion 161 of first encrypted data 160 or first key exchange event 171 arrived at first node 151 from second node 152, and another clock time may be recorded when the last packet or packet fragment of first portion 161 of first encrypted data 160 or first key exchange event 171 arrived at node 151 from second node 152. These clock times may be combined into a time range, stored in first data stores 110, and linked, indexed, or otherwise associated with first portion 161 of first encrypted data 160 and/or first key exchange event 171.

Generally, time ranges associated with key exchange events can alternate sequentially with time ranges associated with portions of encrypted data because data exchanged in a prior key exchange event may serve as a basis for encrypting a later portion of encrypted network traffic during an encryption session. For example, the time range associated with first key exchange event 171 may be prior to the time range associated with first portion 161, and the time range associated with second key exchange event 172 may be after the time range associated with first portion 161.

In an implementation, a forensics system 192 may include one or more second computing devices 120 and a second set of one or more data stores 130. Second computing device 120 may be in communication with first computing device 100 over a second communications channel that is secure and distinct from the first communications channel between first node 151 and first computing device 100. Forensics system 192 may include one or more forensics and cyber security analysis components, such as ORACLE® Audit Vault and ORACLE® Database Firewall. Second computing device 120 may send a request to first computing device 100 to be granted access to inspect network traffic 181. The request from computing device 120 may include various access criteria. For example, access criteria may include a specified time range when network traffic was received by node 151, a specific node or nodes of network 180 from which network traffic was received, specific characteristics of packets or packet fragments by which network traffic may be identified such as data included in the headers or other components of the packets, or specific behaviors exhibited by packets or packet fragments by which network traffic may be identified.

In response to the request from the second computing device 120, first computing device 100 can query the recorded network traffic 181 stored on data stores 110 based on access criteria included in the request. The query may be executed to determine whether a relevant portion of network traffic 181 is recorded on data stores 110. For example, first computing device 100 may compare the time range included in the request to the time ranges associated with events in the set of key exchange events 170 and/or portions of first encrypted data 160. First computing device 100 may select one or more potions of first encrypted data 160 and/or key exchange events of the set of key exchange events 170 that are associated with a time range within or overlapping with the time range included in the request from second computing device 120.

In some implementations, once relevant portions of network traffic 181 have been identified, first computing device 100 can record or mirror the relevant portions to one or more data stores of the second data stores 130. For example first encrypted portion 161 and first key exchange event 171 may be identified as relevant and replicated to a data store of second data stores 130. First computing device 100 can use one or more values of key exchange event 171 with first private key 140 to calculate first encryption key 102 and send first encryption key 102 to second computing device 120. Forensics system 192 can then decrypt first portion 161 based on first encryption key 102. Once first portion 161 is decrypted, forensics system 192 can inspect the decrypted first portion 161 for malware, other forms of unauthorized access to network 180, or any other data deemed to be of interest according to services, policies, or other procedures executing on forensics system 192.

Access Sequences

Figure 2:
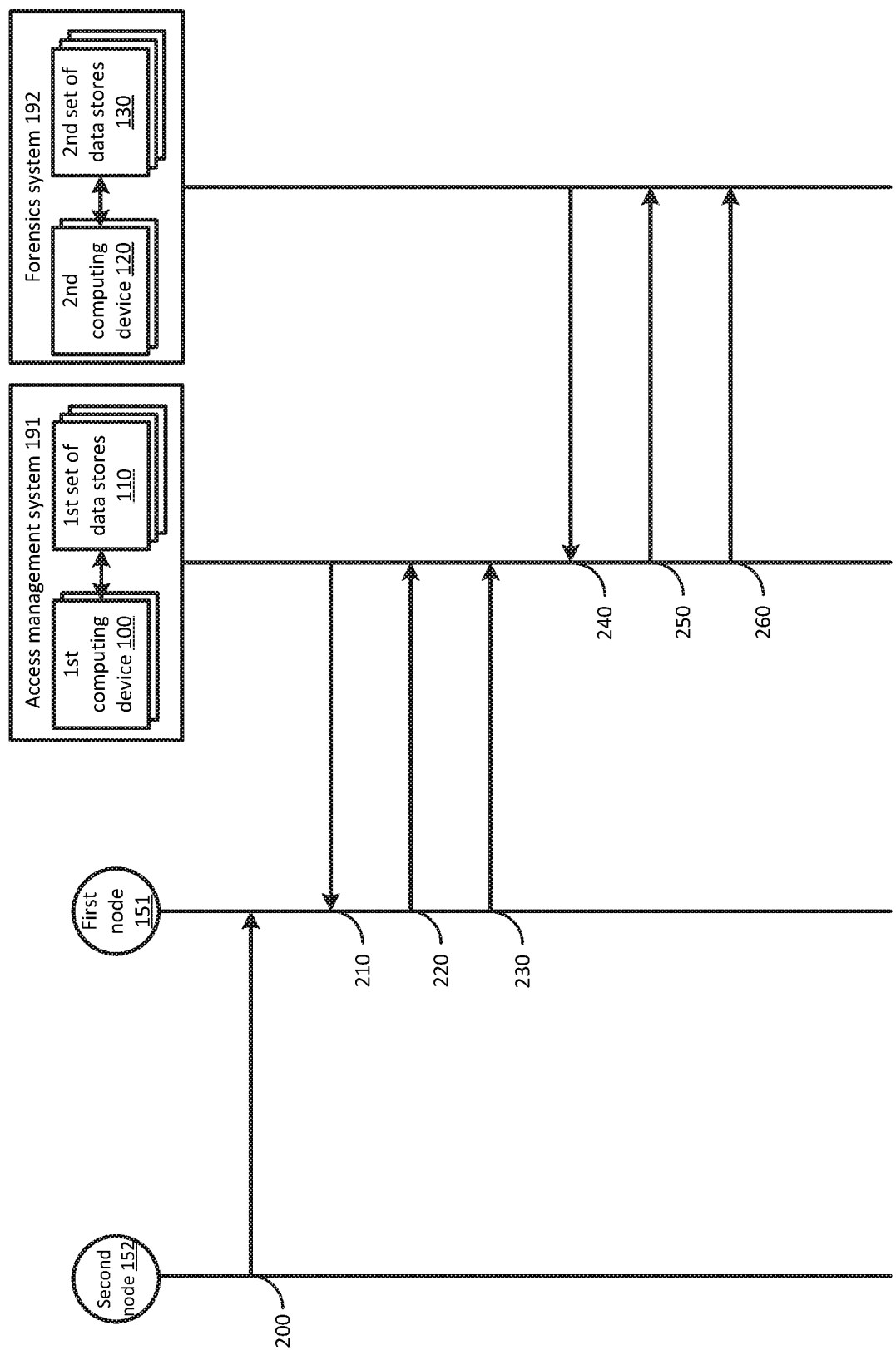
FIG. 2 shows an example sequence diagram for network traffic inspection according to an implementation of the disclosure.

Data may be transmitted in implementations of this disclosure in various sequences and across various components of the component environment described above with respect to FIG. 1. FIG. 2 shows an example sequence diagram for network traffic inspection according to an implementation of the disclosure. Network traffic 181 may be transmitted to and from various nodes of network 180 in accordance with various network protocols. For example, second node 152 may transmit network traffic 181 to first node 151 at 200.

At 210, first computing device 100 of access management system 191 may send to first node 151, authentication credentials along with a request to access network traffic 181. First node 151 may authenticate computing device 120 and send a notice to first computing device 100 indicating that access to network traffic 181 is granted at 220. In some implementations, authentication credentials may be sent in a separate communication from the communication at 210 or may not be necessary because first computing device 100 may already be authenticated by node 151. Computing device 100 can access network traffic 181 via node 151 and begin recording data from network traffic 181 to one or data stores of the set of data stores 110. As a result, data from network traffic 181 may be sent to first computing device 100 at 230.

Second computing device 120 of forensics system 192 may send a request to first computing device 100 at 240. The request may include a request to access a portion of network traffic 181 that is consistent with access criteria included in the request and a credential for authentication of second computing device 120. For example, the access criteria may specify that the network traffic 181 was transmitted during a specified time range. At 250 first computing device 100 can send a notification to second computing device 120 indicating second computing device 120 has been authenticated as well as an authentication credential for authenticating first computing device 100 by second computing device 120. In some implementations, authentication credentials for first computing device 100 may be sent in a separate communication from the communication at 250 or may not be necessary because first computing device 100 may already be authenticated by computing device 120. As a result, first computing device 100 may be mutually authenticated with second computing device 120.

First computing device 100 can select a portion of stored network traffic 181 that was transmitted over first node 151 within the time range included in the request for access by second computing device 120. At 260 first computing device 100 can mirror the relevant portion of stored network traffic 181 from one or more of the first set of data stores 110 to one or more of the second set of data stores 130 and can provide second computing device 120 a calculated encryption key relevant to the mirrored network traffic. In some implementations, the calculated encryption key may be sent in a separate communication from communication 260. As a result, forensics system 192 may decrypt and analyze the relevant portion of stored network traffic 181.

Access Procedures

Figure 3:
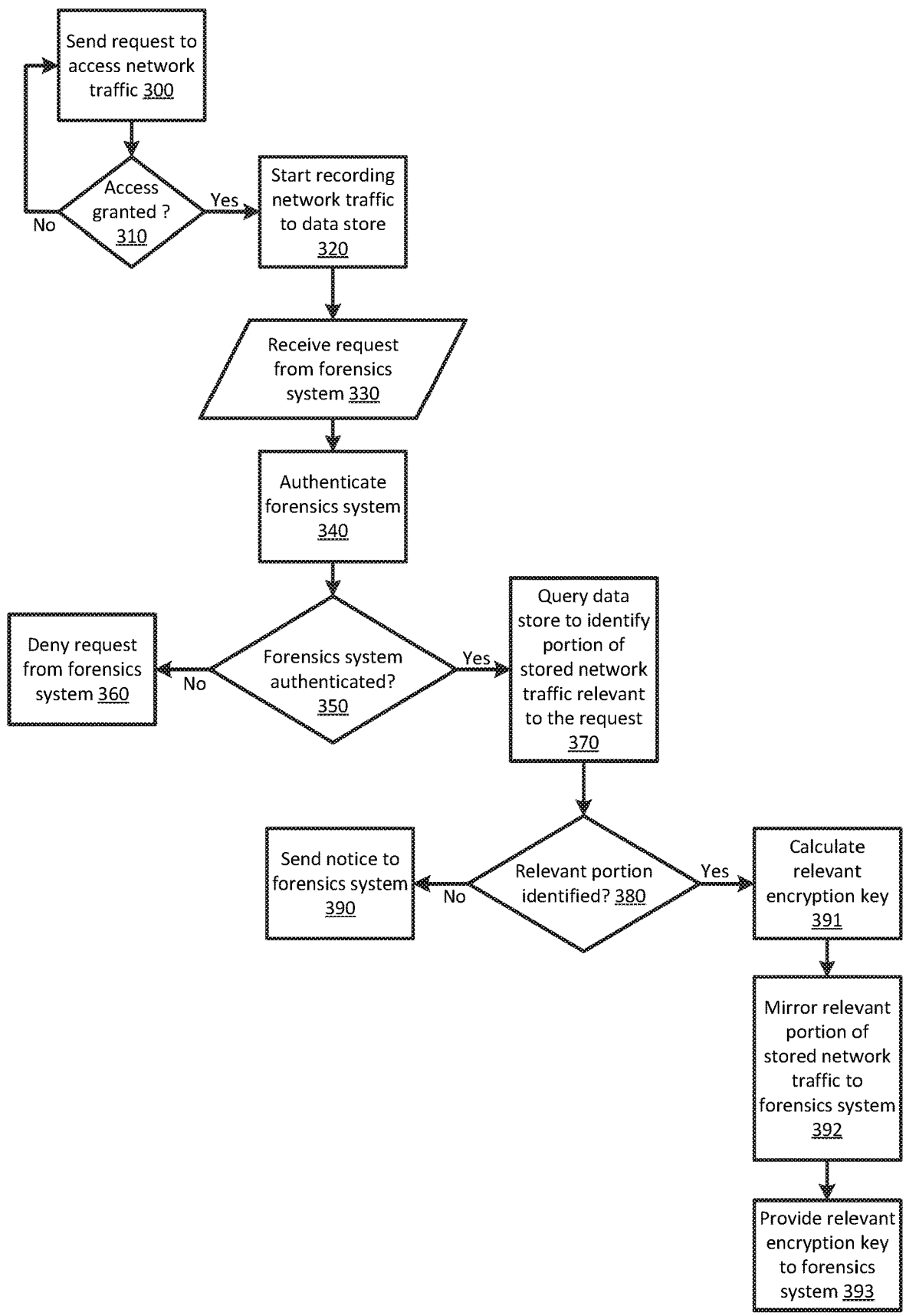
FIG. 3 shows an example procedure for network traffic inspection according to an implementation of the disclosure.

Various procedures may be executed in implementations of this disclosure to access, store, decrypt, and inspect encrypted network traffic. FIG. 3 shows an example procedure for network traffic inspection according to an implementation of the disclosure. At 300 a computing device of access management system 191, such as first computing device 100 may provide a request to access network traffic 181 to first node 151 of network 180. If access is denied at 310, then the request may be resent. This may occur if, for example, packets transporting the request were lost, authentication failed, or first node 151 was offline.

If access is granted at 310, then at 320, in response to receiving access to network traffic 181 from first node 151, first computing device 100 can write data from network traffic 181 to at least a first data store of a set of one on more data stores 110 in communication with first computing device 151. Data from network traffic 181 can include a first encrypted data 160 such as portion 161 of encrypted network traffic 182 and a first set of key exchange events, such as first key exchange event 171 and/or second key exchange event 172 of unencrypted network traffic 183. Writing the data from network traffic 181 can include writing some or substantially all of network traffic 181 that transmits over first node 151 of network 180 over a period of time such as one or more hours, days, weeks, or months. The first encrypted data and/or unencrypted data can also include an initialization vector recorded from network traffic 181. In some implementations, key exchange events may also be encrypted, such as, for example, in accordance with an encryption protocol or technique different from that used to encrypt encrypted network traffic 182.

At 330, before, during, or after the recording of network traffic 181 by first computing device 100 of access management system 191, first computing device 100 may receive a request from second computing device 120 of forensics system 192 to access encrypted data transmitted over network 180. The request from second computing device 120 can include access criteria, such as is described above with respect to FIGS. 1 and 2. In some implementations, access management system 191 can concurrently manage access by forensic system 192 to network traffic over variety of networks in addition to network 180 via various network nodes. Thus the included access criteria can specify the network of interest from which to record network traffic.

The request received at 330 may include authentication credentials, and at 340, in response to receiving the request, first computing device 100 can authenticate second computing device 120 such as is discussed above with respect to FIGS. 1 and 2. In some implementations, first computing device 100 may also send authentication credentials to second computing device 120 to execute mutual authentication. If, at 350, authentication fails for second computing device 120, then first computing device 100 can deny the request received from forensics system 192 at 360.

If authentication is successful at 350, then at 370 first computing device 100 can query first data stores 110 for relevant network traffic such as by identifying a first portion 161 of the encrypted network data 160 and a first key exchange event 171 of the set of key exchange events 170 included in the stored network traffic 181. This identification by first computing device 100 may be based on access criteria such as a time range included in the request from second computing device 120 as described above with respect to FIGS. 1 and 2. If, at 380, no relevant network traffic can be identified, then at 390 the request from forensics system 192 may be denied or notice may be sent to second computing device 120 indicating no relevant results.

If relevant network traffic is identified at 380, then first computing device 100 can calculate a relevant encryption key, such as first encryption key 102 based on the data included in the first key exchange event 171 at 391. First encryption key 102 may be deemed relevant because it enables decryption of the relevant portion of network data identified above. First encryption key 102 can be calculated in implementations of this disclosure by first computing device 100 according to a variety of techniques. In some implementations, first computing device 100 can calculate first encryption key 102 according to the same procedure executed by nodes of network 180.

Each node 151-154 of network 180 may execute procedures, such as by executing an encryption engine, to manage encryption parameters and calculate values relevant to encryption and encryption keys. An administrative component or controller of Network 180 may specify that first node 151 and second node 152 each store the same values, for example a modulus value p and base value g. Modulus value p may be a prime number, and base value g may be a primitive root modulo p. First node 151 may store first private key 140 that is a value a, and second node 152 may store a second private key 141 that is a value b. First node 151 can execute a procedure $g^a$ mod p to generate a value A, and second node 152 can execute a procedure $g^b$ mod p to generate a value B. During a key exchange event, such as first key exchange event 171, second node 152 may send value B to first node 151, and first node 151 may send value A to second node 152. First node 151 can execute a procedure $B^a$ mod p to generate a value $S_1$, and second node 152 can execute a procedure $A^b$ mod p to generate a value $S_2$. According to the procedures above $S_1$ will equal $S_2$. Thus first encryption key 102 may be defined as $S_1$ or $S_2$.

As set forth above, first node 151 and second node 152 can each independently generate first encryption key 102 based on data exchanged in first key exchange event 171. For example, first data exchanged in first key exchange event 171 may be an unencrypted value such as value A or value B. As shown above, value A or value B, and first private key 140 or second private key 141 may be used with modulus value p and base value g to calculate first encryption key 102. As a result, First node 151 and second node 152 can calculate first encryption key 102 and use first encryption key 102 to encrypt and decrypt communications between first node 151 and second node 152.

In some implementations, first computing device 100 may store first private key 140 as well as other values that can serve as a basis for calculating first encryption key 102. For example, first computing device 100 can receive from first node 151, a private key associated with first node 151 such as first private key 140, as well as modulus value p and base value g. First computing device 100 can record and store unencrypted network traffic 183, which may include value A and/or value B of first key exchange event 171. In some implementations, modulus value p and base value g may also be included in unencrypted network traffic 183 and accessed similarly. Based on the received first private key 140 (value a), unencrypted value B, modulus value p, and base value g, first computing device 100 can independently calculate first encryption key 102. For example, first computing device 100 may execute a procedure $B^a$ mod p to generate a value $S_1$=first encryption key 102. In other implementations of this disclosure, nodes 151-154 of network 180, first computing device 100, or other components set forth in this disclosure may execute other encryption algorithms and protocols, such as those discussed above with respect to FIGS. 1 and 2, to generate first encryption key 102 or other applicable values based on data exchanged in first key exchange event 171, other network traffic, or other data accessible to such nodes, computing devices, or components.

At 391, as discussed above, first computing device can calculate a relevant encryption key such as first encryption key 102. At 392, first computing device 110 can provide to second computing device 120 access to the first portion 161 of first encrypted data 160 of the network traffic 181 stored in data stores 110. For example first computing device 100, can mirror first portion 161 from a first set of one or more data stores 110 to a second set of one or more data stores 130 in communication with second computing device 120 of forensics system 192. In some implementations, first computing device 100 can execute a first virtual machine and function as a primary host and second computing device 120 can execute a second virtual machine and function as a secondary host. The primary host and secondary host may be linked as a host pair to facilitate mirroring between first data stores 110 and second data stores 120.

At 393, the first computing device may provide the calculated encryption key 102 to second computing device 120 of forensics system 192. Forensics system 192 may access first portion 161 of first encrypted data 160 mirrored on data stores 130 and decrypt first portion to enable forensic and cyber security analysis as discussed above with respect to FIGS. 1 and 2.

In some implementations, first node 151 may provide first encryption key 102 directly to first computing device 100; however generally first encryption key 102 is not distributed outside of node 151 or other nodes of network 180 to reduce the risk of compromising network 180. Further, first encryption key 102 may be a session key that changes as modulus value p, base value g, or private keys are changed across one or more nodes of network 180. Nodes 151-154 of network 180 may delete generated encryption keys, such as encryption key 102, after the expiration of each session because such encryption keys are no longer useful outside of their session. Thus first computing device 100 may not have access to first encryption key 102 after its associated session expires.

First computing device 100 may protect access by second computing device 120 or other components of this disclosure to certain stored data to minimize the risk of network compromise. In an implementation, first computing device 100 can prevent access to portions of first encrypted data 160 other than first portion 161 and to private key 140. For example, first computing device 100 can store first portion 161 and private key 140 in memory locations or partitions to which second computing device 120 does not have access. In another example, first computing device 100 can encrypt first portion 161 and private key 140 with a second encryption key that is substantially inaccessible to second computing device 120. In another example, first computing device 100 can prevent access to or refrain from generating encryption keys for portions of first encrypted data 160 other than portions matching access criteria submitted in access requests by second computing device 120.

Figure 4:
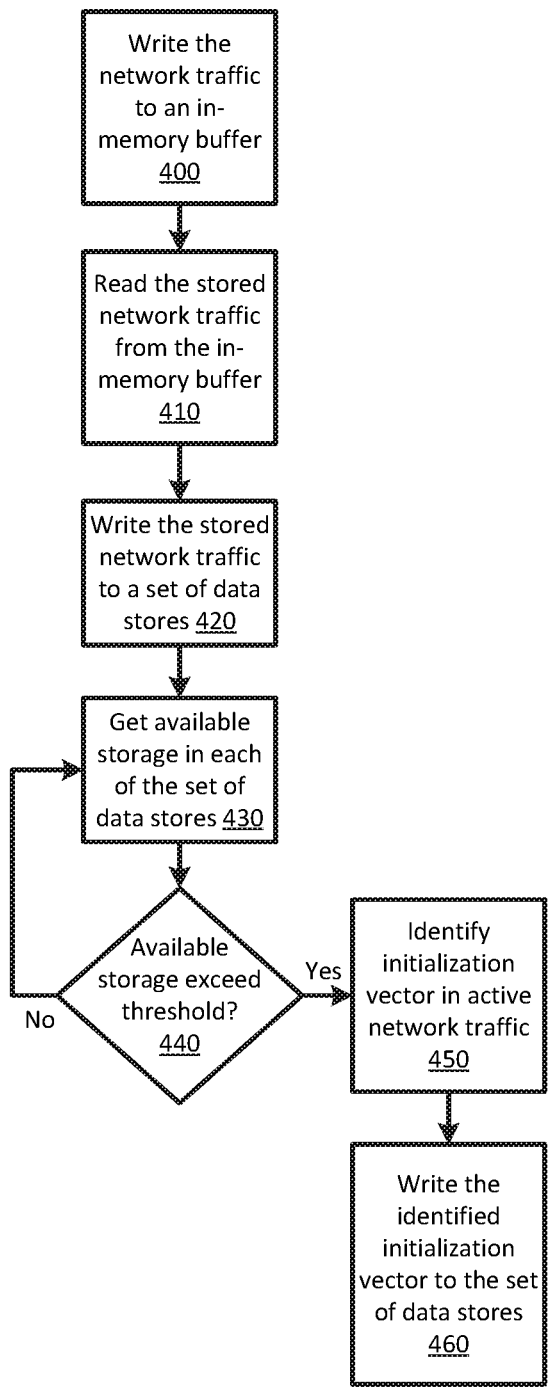
FIG. 4 shows an example procedure for managing network traffic storage according to an implementation of the disclosure.

In some implementations, first data stores 110 may execute a retention policy whereby stored network traffic is deleted once a storage threshold is reached. FIG. 4 shows an example procedure for managing network traffic storage according to an implementation of the disclosure. At 400, first computing device 100 can write data of network traffic 181 to at least one data store of the first set of data stores 110 by, for example, first writing the network traffic data to in-memory buffer 101 of access management system 191. A 410 the network traffic can be read from in-memory buffer 101, and at 420, first computing device 100 can write the network traffic to one or more data stores of the first set of data stores 110. Writing to in-memory buffer 101 may be beneficial to reduce latency in recording network traffic 181 from network 180 before writing to first data stores 110.

Each data store of the first set of data stores 110 may have a storage threshold, such as a threshold specifying a maximum quantity of data. At 430, first computing device 100 can request and receive an indicator of the current available storage level in one or more of the first set of data stores 110. If, at 440, available storage in some or all of the first set of data stores 110, has not exceeded the respective threshold, then first computing device 100 can request another storage level indicator. Being at a threshold level can mean being at or exceeding the threshold level such that a minimum or less quantity is reached or a maximum or greater quantity is reached. If at 440 first computing device 100 determines that available storage of one or more first data stores 110 is at a threshold level, then in response to this determination, first computing device 100 can identify an initialization vector within network traffic 181 transporting over first node 151 at 450. At 460, first computing device 100 can write the identified initialization vector to one or more first data stores 110. Upon successfully writing the initialization vector, access management system 191 via first computing device 100 can delete the data present in the first set of data stores 110. Recording network traffic 181 may continue while an implementation of the procedure disclosed in FIG. 4 executes or may pause and restart after the initialization vector is written.

Figure 5:
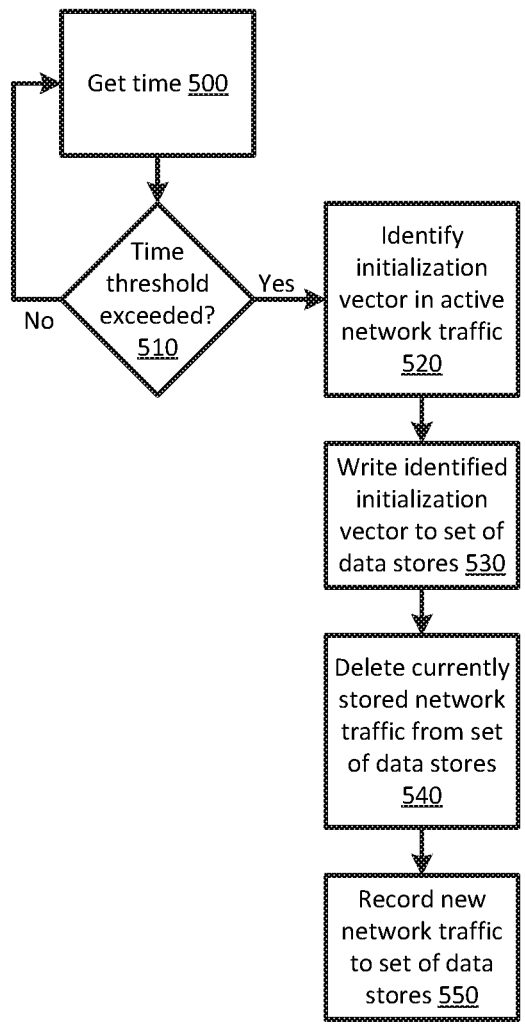
FIG. 5 shows an example procedure for managing network traffic storage according to an implementation of the disclosure.

In some implementations, a data retention policy may execute on data stored on first data stores 110 whereby stored network traffic is deleted once a time threshold is reached. FIG. 5 shows an example procedure for managing network traffic storage according to an implementation of the disclosure. At 500, first computing device 100 can get a current time value and compare it to a threshold time period. If, at 510, the threshold time period has not expired, then first computing device 100 can get another time value. If at 510, based on the comparison to the threshold period, first computing device 100 determines that the threshold period of time has expired, then at 520, in response to the determination, first computing device 100 can identify an initialization vector within network traffic 181 transporting over first node 151.

An initialization vector may be used to determine the state of an encryption engine executing on first node 151 and, along with a relevant encryption key, enable the decryption of network traffic encrypted while the encryption engine was in the determined state. For example, in some implementations, the nodes 151-154 of network 180 may execute a mode of encryption that sets a new initialization vector for each packet or set of packets of encrypted network traffic 182 using the results of prior encrypted packets or sets of packets. When these prior packets are discarded from data stores 110, first computing device 100 can record the current initialization vector from network traffic 180 to permit the reconstruction of the state of the encryption engine following the point at which traffic is discarded. In some implementations, a state of the encryption engine may include parameters such as value A, value B, first private key 140, second private key 141, modulus value p, and base value g, and/or other parameters used by the encryption engine.

At 530, first computing device 100 can write the identified initialization vector to at least one data store of the first set of data stores 110. In response to successfully writing the identified initialization vector, first computing device 100 can delete the data present on the first set of data stores 110 at 540. At 550, first computing device 100 can continue writing network traffic 181 to the first set of data stores 110. The newly written network traffic 181 can be different from the deleted network traffic 181, for example, newly written network traffic 181 could be transported over the network 180 at a later time than deleted network traffic 181.

In some implementations, it may be beneficial to prevent access by the forensic system 192 to the first private key 140 of node 151 and to portions of stored network traffic 181 other than relevant portions. Relevant portions may include, for example, a first portion 161 of first encrypted data 160 of encrypted network traffic 182 identified by first computing device 100 based on a time range specified in a request received from forensics system 192.

Figure 6:
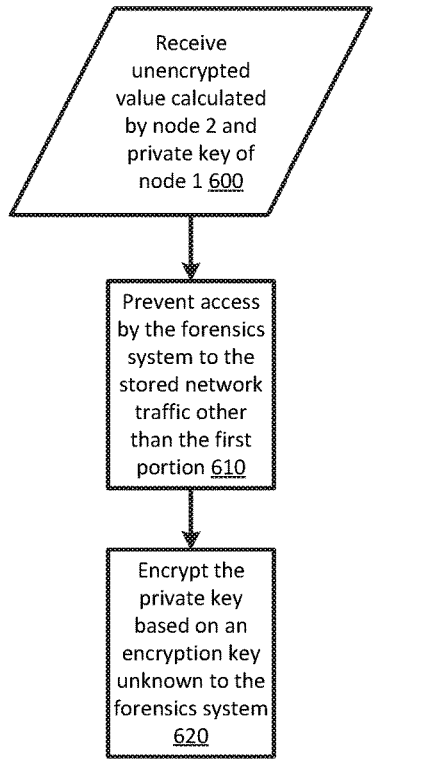
FIG. 6 shows an example procedure for limiting a forensic system's access to network traffic according to an implementation of the disclosure.

FIG. 6 shows an example procedure for limiting forensic system access to network traffic according to an implementation of the disclosure. At 600, a computing device, such as first computing device 100 may receive first private key 140 associated with first node 151 and a value exchanged in a key exchange event between second node 152 and first node 151. The value exchanged may be unencrypted and may be used with first private key 140 to calculate first encryption key 102. At 610 access management system 191 can, via first computing device 100, prevent access to portions of stored network traffic 181 other than the relevant portions by a computing device 120 of forensics system 192. For example, first computing device 100 may only allow mirroring of portions of network traffic 180 that are transmitted over node 151 within a time range indicated within the request from forensics system 192. At 620 computing device 100 may prevent access to private key 140 associated with first node 151, for example, by encrypting first private key 140 based on a second encryption key that is unknown and substantially inaccessible to components of forensic system 192, such as computing device 120.

Figure 7:
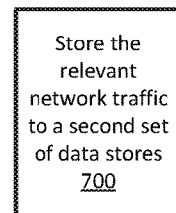
FIG. 7 shows an example procedure for detecting unauthorized network access according to an implementation of the disclosure.

In some implementations, when granted access to network traffic 181, forensics system 192 can detect unauthorized access to network 180. FIG. 7 shows an example procedure for detecting unauthorized network access according to an implementation of the disclosure. Unauthorized access to a network such as network 180 may include malware, such as viruses, worms, trojan horses, or spyware, as well as intrusions and other network use conducted without authorization.

As shown in FIG. 7, at 700 a computing device, such as second computing device 120 of forensics system 192 can store the relevant network traffic received from access management system 192 to one or more of the second set of data stores 130. Using an encryption key provided by access management system 191, second computing device 192 can decrypt the relevant network traffic at 710. Relevant network traffic may include a first portion 161 of first encrypted data 160 included in the received relevant network traffic. At 720 first computing device 120 can analyze the decrypted relevant network traffic by utilizing any network security or forensics technique suitable for the purposes of this disclosure, such as those discussed above with respect to FIGS. 1-3. At 730 based on the analysis, second computing device 120 of forensics system 192 can detect data associated with unauthorized access to network 180 within the relevant network traffic.

In some implementations, forensics system 192 can send an alert to access management system 191 based on the detection of data associated with unauthorized access. The alert may include instructions for detecting, quarantining, or otherwise preventing further network access to data packets associated with the alert. For example identifying information included in a visible header of suspicious data packets can be included in the alert. In another example, an alert may include identifying information such as behavioral characteristics of suspicious packets as they are being transmitted over the network 180. In response to receiving this alert, access management system 191 may in turn relay the alert to one or more nodes on network 180 such as nodes 151-154. In some implementations, access management system 191 may have greater visibility to the behavior of packets on network 180. For example, access management system 191 may execute one or more processes that monitor the behavior of data packets as they are recorded from network traffic 181, such as their source and destination addressing, fragmentation, type of service, or other data, such as data included in the header of the packet. As a result, in some implementations, access management system 191 can more accurately characterize the type of network behavior that would tend to identify a packet associated with unauthorized access that is detected by forensics system 192. Thus, in some implementations, access management system 191 may determine and provide instructions to nodes 151-154 in response to receiving an alert from forensics system 192 that certain data in network traffic 181 is associated with unauthorized access.

Figure 8:
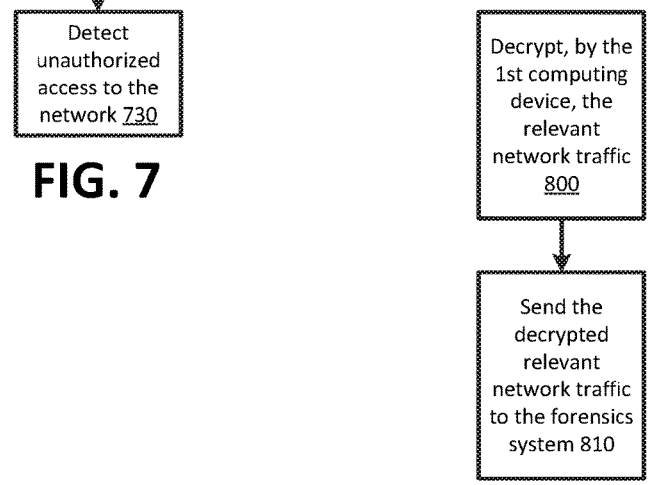
FIG. 8 shows an example procedure for network traffic decryption according to an implementation of the disclosure

In some implementations, network traffic 180 may not be mirrored to a data store of forensics system 192. Rather, the relevant encrypted network traffic can be decrypted and sent to forensics system 192 without the need to provide a relevant encryption key. FIG. 8 shows an example procedure for network traffic decryption according to an implementation of the disclosure. A component of access management system 191 such as first computing device 100 can determine a first portion 161 of a first encrypted data 160 to be a relevant portion in accordance with any applicable technique discussed herein, including as discussed above with respect to FIGS. 1-3. For example, a first key exchange event 171 may be determined to include data used to encrypt the relevant portion of network traffic 181. The data may include a value initially received by node 151 from node 152 that resulted from a calculation performed by second node 152. This value may serve as a basis in an exponential calculation with first private key 102 of node 151 to determine the encryption key used to encrypt the relevant portion of network traffic 181. Any other technique discussed herein may also be used to generate an encryption key, such as those discussed with respect to FIGS. 1-3. At 800, first computing device 100 can decrypt the relevant portion based the data exchanged in the first key exchange event 171. At 810, first computing device 100 can provide the decrypted relevant portion to second computing device 130 to enable forensics system 192 to analyze the data for potential threats.

In some implementations, first computing device 100 may encrypt the decrypted relevant portion using an encryption key and/or protocol different from that used by first node 151 or other components of network 180 before sending to forensics system 192. This different encryption key and/or protocol may be shared between access management system 191 and forensics system 192 to maintain security from third party attacks when relaying the relevant portion of network traffic between systems.

Implementations of this disclosure may support multi-tenancy. A tenant may be, for example, a user, group of users, organization, subset of an organization, or any set of users who share access with specific privileges to a software instance such as an instance of a database maintained by first node 151 or second node 152. Multi-tenancy may allow various tenants to access their own records on a one or more servers through software tools or instances on the one or more servers that may be shared among the various tenants. The records for each tenant may be part of a database for that tenant. Records for multiple tenants may all be stored together within the same one or more servers, but each tenant may only be able to access records which belong to, or were created by, that tenant. This may allow a set of one or more servers to enable multi-tenancy without having to store each tenant's records separately, for example, on separate servers or server systems.

In some implementations, components such as those discussed above with respect to FIG. 1 may execute in a public, private, or hybrid public/private cloud environment. For example, in some implementations, first computing device 100, second computing device 120, and first node 151 are components of a first cloud computing environment and second node 152 is a component of a second cloud computing environment. At least one tenant of the second cloud computing environment may not be a tenant of the first cloud computing environment. In one example, a first tenant may provide cloud-based software services to consumers via first node 151. Second node 152 may be a consumer device interacting with first node 151.

In some implementations, a tenant may provide cloud-based software services via second node 152, such as a marketing platform accessible by customers and the software provider. First node 151 may function as a database executing on a server and supporting the platform executing on second node 152. The software provider may be a tenant of access management system 191, forensics system 192, and first node 151. The software provider and one or more customers may each be tenants of second node 152. Customers providing data to second node 152 may introduce data that is not authorized to be introduced to network 180, such as malware. Implementations of this disclosure may detect or enable the detection of unauthorized data as a result, for example of analysis by forensic system 192.

In other examples, first computing device 100, second computing device 120, first node 151, and second node 152 may be components of the same cloud computing environment having no more than a single tenant. Thus a single organization may execute implementations of this disclosure to perform forensic analysis of encrypted communications transported and/or generated within their own organization. For example, a first department of an organization may maintain first node 151 and a second department of the organization may maintain second node 152. Thus implementations of this disclosure may detect or enable the detection of unauthorized use of network 180 by the first department or the second department. For example, malware may be detected on database servers in communication with first node 151 having the first department as a tenant, where the malware was introduced by network traffic 181 generated by database servers in communication with second node 152 having the second department as a tenant.

Other Components

Figure 9:
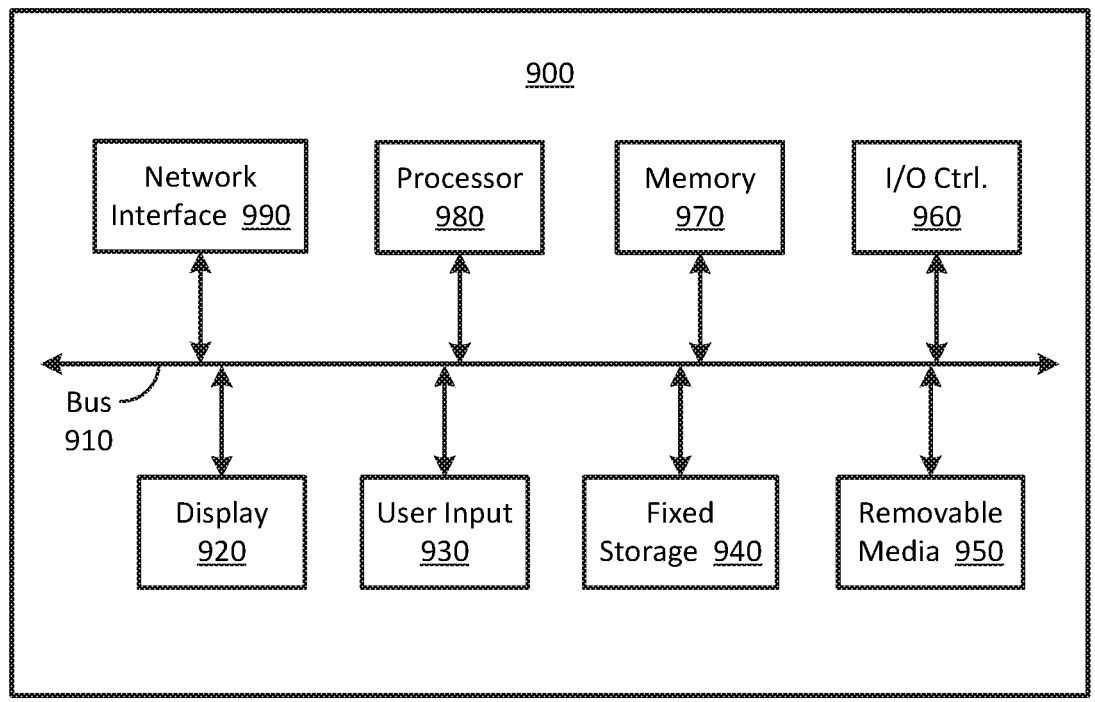
FIG. 9 shows an example computing device according to an implementation of the disclosure.

Implementations of the disclosure may be implemented in and used with a variety of component and network architectures. FIG. 9 is an example computing device 900, suitable for implementations of the disclosure. Computing devices, such as computing device 900, may include computers, servers, mainframes, desktops, laptops, tablets, smart phones, wearable devices, and other computing devices. The computing device 900 includes a bus 910 which interconnects major components of the computing device 900, such as a central processor 980, a memory 970 (typically RAM, but which may also include ROM, flash RAM, or the like), an input/output controller 960, a user display 920, such as a display screen via a display adapter, a user input interface 930, which may include one or more controllers and associated user input devices such as a keyboard, mouse, and the like, and may be closely coupled to the I/O controller 960, fixed storage 940, such as a hard drive, flash storage, Fibre Channel network, SAN device, SCSI device, and the like, and a removable media component 950 operative to control and receive an optical disk, flash drive, and the like.

The bus 910 allows data communication between the central processor 980 and the memory 970, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computing device 900 are generally stored on and accessed via a computer-readable medium, such as a hard disk drive (e.g., fixed storage 940), an optical drive, floppy disk, or other storage medium.

The fixed storage 940 may be integral with the computing device 900 or may be separate and accessed through other interfaces. A network interface 990 may provide a direct connection to a remote server via a telephone link, to the Internet via an internet service provider (ISP), or a direct connection to a remote server via a direct network link to the Internet via a POP (point of presence) or other technique. The network interface 990 may provide such connection using wireless techniques, including digital cellular telephone connection, Cellular Digital Packet Data (CDPD)

connection, digital satellite data connection or the like. For example, the network interface 990 may allow the computing device to communicate with other computing devices via one or more local, wide-area, or other networks, as shown in FIG. 8.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computing device such as that shown in FIG. 9 is readily known in the art and is not discussed in detail in this application. Code or instructions to implement this disclosure can be stored in computer-readable storage media such as one or more of the memory 970, fixed storage 940, removable media 950, or on a remote storage location.

Figure 10:
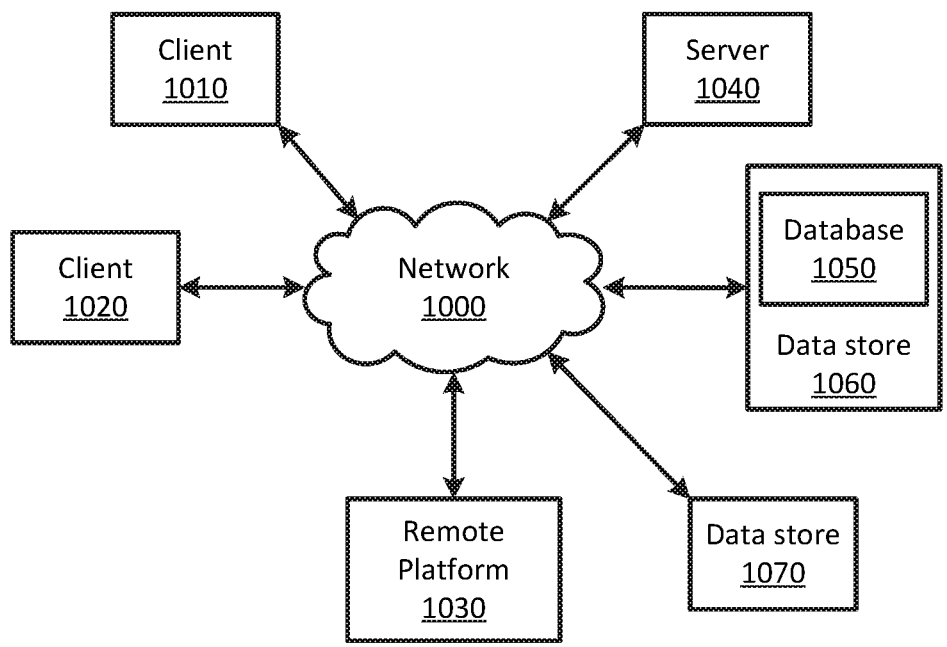
FIG. 10 shows an example network arrangement according to an implementation of the disclosure.

FIG. 10 shows an example network arrangement according to an implementation of the disclosure. One or more clients 1010, 1020, such as local computing devices, smart phones, tablet computing devices, and the like may connect to other devices via one or more networks 1000. The network may be a local network, wide-area network, the Internet, or any other suitable communication network or networks, and may be implemented on any suitable platform including wired and/or wireless networks. The clients may communicate with one or more servers 1040 and/or databases 1050. The devices may be directly accessible by the clients 1010, 1020, or one or more other devices may provide intermediary access such as where a server 1040 provides access to resources stored in a database 1050. Database 1050 may be implemented on a data store 1060, whereas data store 1070 may store data in a non-database format. A data store may be any suitable combination of hardware and software for storing structured and/or unstructured data. The clients 1010, 1020 also may access remote platforms 1030 or services provided by remote platforms 1030 such as cloud computing arrangements and services. The remote platform 1030 may include one or more servers and/or databases.

More generally, various implementations of this disclosure may include or be implemented in the form of computer-implemented procedures or processes and apparatuses for practicing those processes. Implementations also may be implemented in the form of a computing device program product having instructions or computer program code containing instructions implemented in non-transitory and/or tangible media, such as floppy diskettes, CD-ROMs, hard drives, USB (universal serial bus) drives, or any other machine readable storage medium, wherein, when the computing device program code is loaded into and executed by a computing device, the computing device becomes an apparatus for practicing implementations of the disclosure.

Implementations also may be implemented in the form of computer program code, for example, whether stored in a storage medium, loaded into and/or executed by a computing device, or transmitted over some transmission medium, such as over electrical wiring or cabling, through fiber optics, or via electromagnetic radiation, wherein when the computer program code is loaded into and executed by a computing device, the computing device becomes an apparatus for practicing implementations of the disclosure. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosure in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosure.

The foregoing description, for purpose of explanation, has been described with reference to specific implementations. However, the illustrative discussions above are not intended to be exhaustive or to limit implementations of the disclosure to the precise forms disclosed. Many modifications and variations are possible in view of the above teachings. The implementations were chosen and described in order to explain the principles of implementations of the disclosure and their practical applications, to thereby enable others skilled in the art to utilize those implementations as well as various implementations with various modifications as may be suited to the particular use contemplated.

The invention claimed is:

1. A computer-implemented method comprising:
   accessing, by a first computing device, network traffic between a first node of a network and a second node of the network;
   writing, by the first computing device, first data from the network traffic to at least a first data store in communication with the first computing device, the first data comprising first encrypted data and a first plurality of key exchange events;
   storing, by the first computing device, a first private key associated with the first node of the network in at least the first data store in communication with the first computing device; and
   decrypting, by the first computing device, the first encrypted data using the first private key and at least one of the first plurality of key exchange events of the first data to generate a decrypted portion of data.

2. The method of claim 1, further comprising providing the decrypted portion of data to a forensics system.

3. The method of claim 1, wherein the first private key is received from the first node.

4. The method of claim 1, wherein the decrypting, by the first computing device, the first encrypted data using the first private key and the at least one of the first plurality of key exchange events of the first data to generate a decrypted portion of data, further comprises:
   calculating, by the first computing device, a first encryption key based on data included in the at least one of the first plurality of key exchange events; and
   decrypting, by the first computing device, the first encrypted data with the first encryption key.

5. The method of claim 1, wherein the first private key is a basis for decrypting a first portion of the first encrypted data and is not a basis for decrypting other portions of the first encrypted data.

6. The method of claim 1, wherein the network traffic comprises data being transmitted in accordance with at least one protocol selected from the group consisting of a secure shell protocol, a secure sockets layer protocol, a transport layer security protocol, and an internet protocol security protocol.

7. The method of claim 1, wherein the first plurality of key exchange events comprises at least one event selected from the group consisting of: an encryption session initiation event and a key renegotiation event.

8. A non-transitory, computer readable medium storing instructions that, when executed by a processor, cause the processor to perform operations comprising:
   accessing, by a first computing device, network traffic between a first node of a network and a second node of the network;
   writing, by the first computing device, first data from the network traffic to at least a first data store in communication with the first computing device, the first data comprising first encrypted data and a first plurality of key exchange events;
   storing, by the first computing device, a first private key associated with the first node of the network in at least the first data store in communication with the first computing device; and
   decrypting, by the first computing device, the first encrypted data using the first private key and at least one of the first plurality of key exchange events of the first data to generate a decrypted portion of data.

9. The computer-readable medium of claim 8, wherein the first private key is a basis for decrypting a first portion of the first encrypted data and is not a basis for decrypting other portions of the first encrypted data.

10. The computer-readable medium of claim 8, wherein the network traffic comprises data being transmitted in accordance with at least one protocol selected from the group consisting of a secure shell protocol, a secure sockets layer protocol, a transport layer security protocol, and an internet protocol security protocol.

11. The computer-readable medium of claim 8, wherein the first plurality of key exchange events comprises at least one event selected from the group consisting of: an encryption session initiation event and a key renegotiation event.

12. The computer-readable medium of claim 8, further comprising providing the decrypted portion of data to a forensics system.

13. The computer-readable medium of claim 8, wherein the first private key is received from the first node.

14. The computer-readable medium of claim 8, wherein the decrypting, by the first computing device, the first encrypted data using the first private key and the at least one of the first plurality of key exchange events of the first data to generate a decrypted portion of data, further comprises:
   calculating, by the first computing device, a first encryption key based on data included in the at least one of the first plurality of key exchange events; and
   decrypting, by the first computing device, the first encrypted data with the first encryption key.

15. A system comprising
   a first data store;
   a first computing device in communication the first data store and comprising a processor in communication with a network, the processor configured to access network traffic between a first node of a network and a second node of the network, write first data from the network traffic to at least a first data store in communication with the first computing device, the first data comprising first encrypted data and a first plurality of key exchange events, stores a first private key associated with the first node of the network in at least the first data store in communication with the first computing device, and decrypts, by the first encrypted data using the first private key and at least one of the first plurality of key exchange events of the first data to generate a decrypted portion of data.

16. The system of claim 15, wherein the first private key is a basis for decrypting a first portion of the first encrypted data and is not a basis for decrypting other portions of the first encrypted data.

17. The system of claim 15, wherein the network traffic comprises data being transmitted in accordance with at least one protocol selected from the group consisting of a secure shell protocol, a secure sockets layer protocol, a transport layer security protocol, and an internet protocol security protocol.

18. The system of claim 15, wherein the first plurality of key exchange events comprises at least one event selected from the group consisting of: an encryption session initiation event and a key renegotiation event.

19. The system of claim 15, further comprising providing the decrypted portion of data to a forensics system.

20. The system of claim 15, wherein the processor is configured to decrypt the first encrypted data using the first private key and the at least one of the first plurality of key exchange events of the first data to generate a decrypted portion of data by:
   calculating a first encryption key based on data included in the at least one of the first plurality of key exchange events; and
   decrypting the first encrypted data with the first encryption key.

* * * * *